June 24, 1941.   A. C. CUNNINGHAM   2,246,877
ROTARY FILTER
Filed June 8, 1937   3 Sheets-Sheet 3
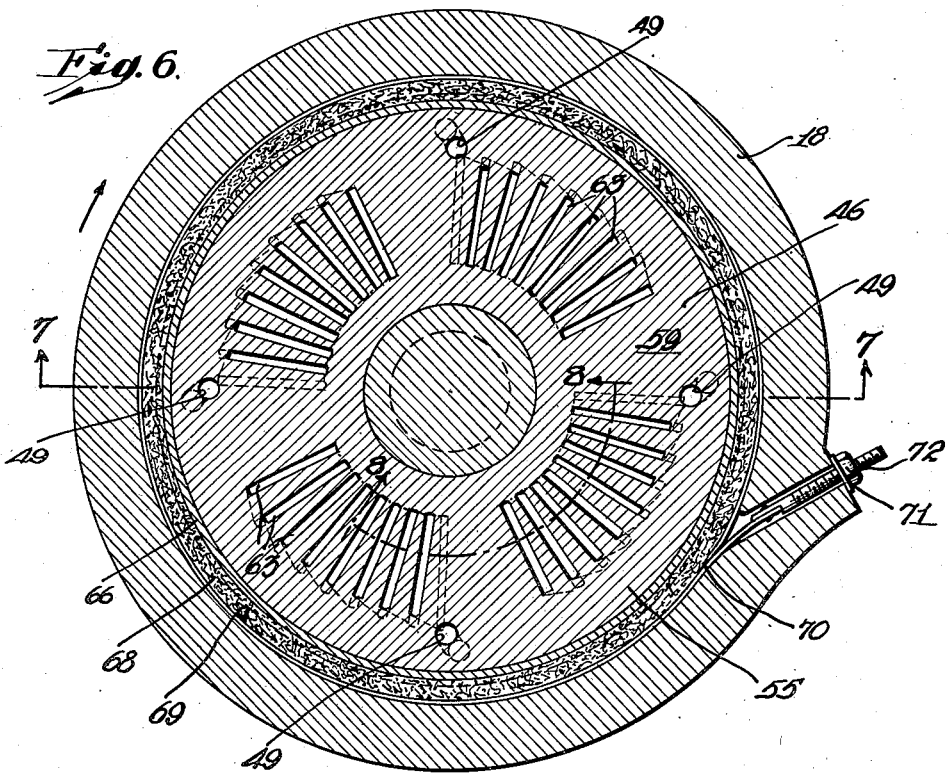
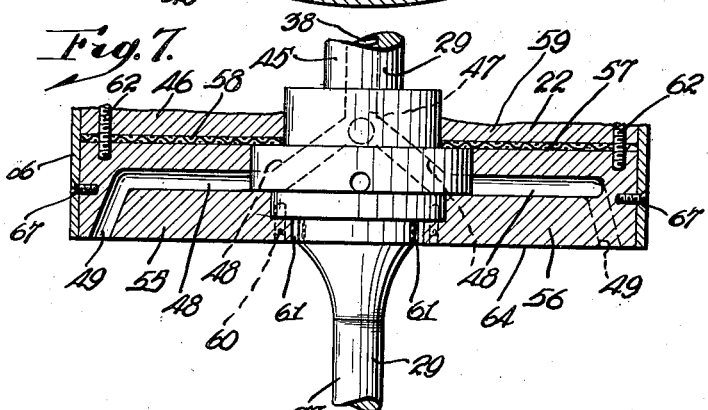
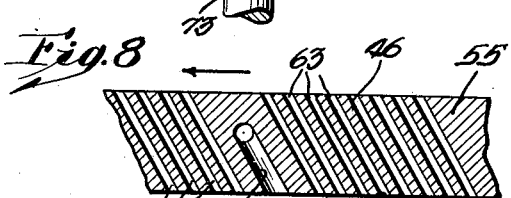

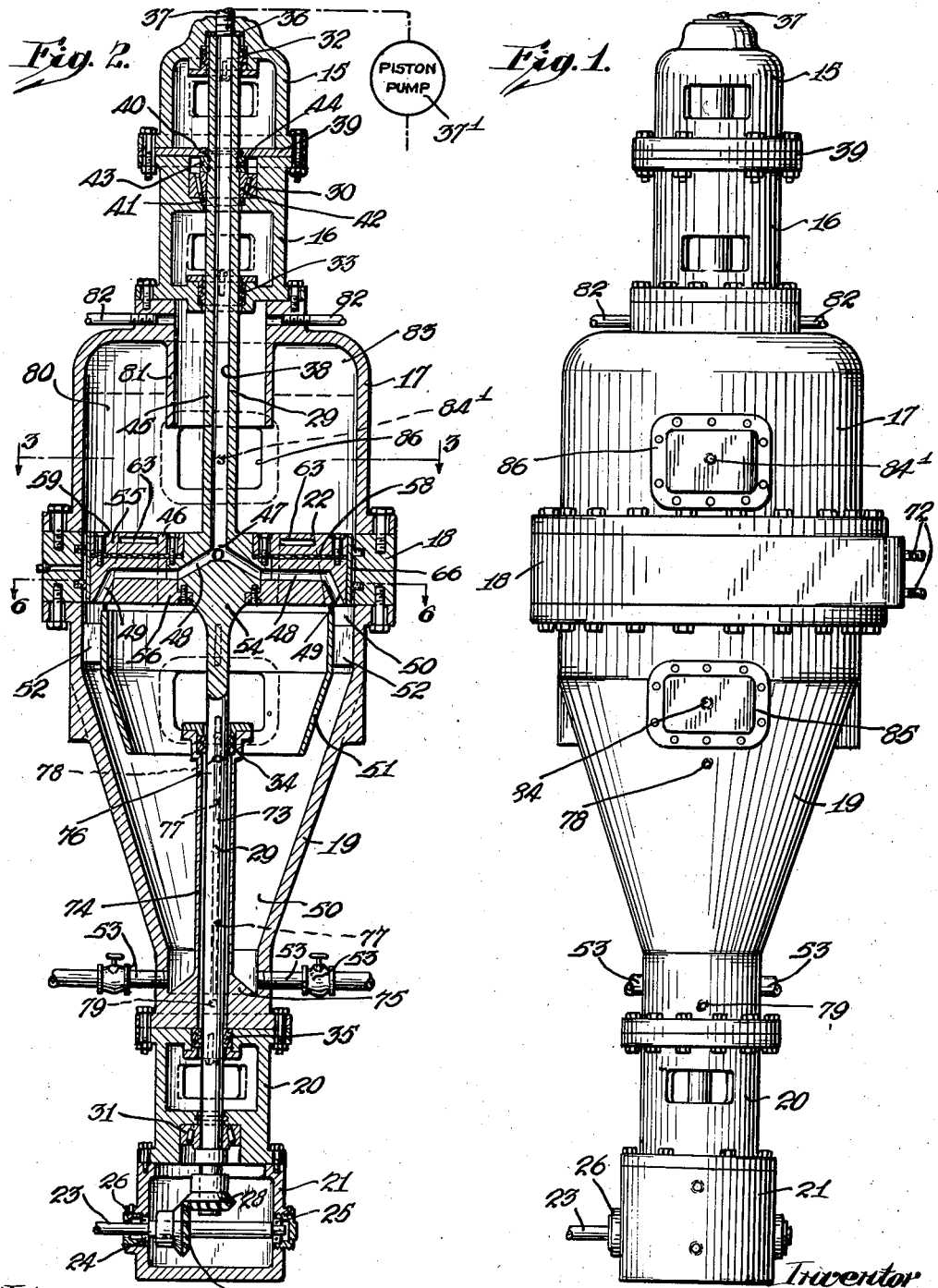

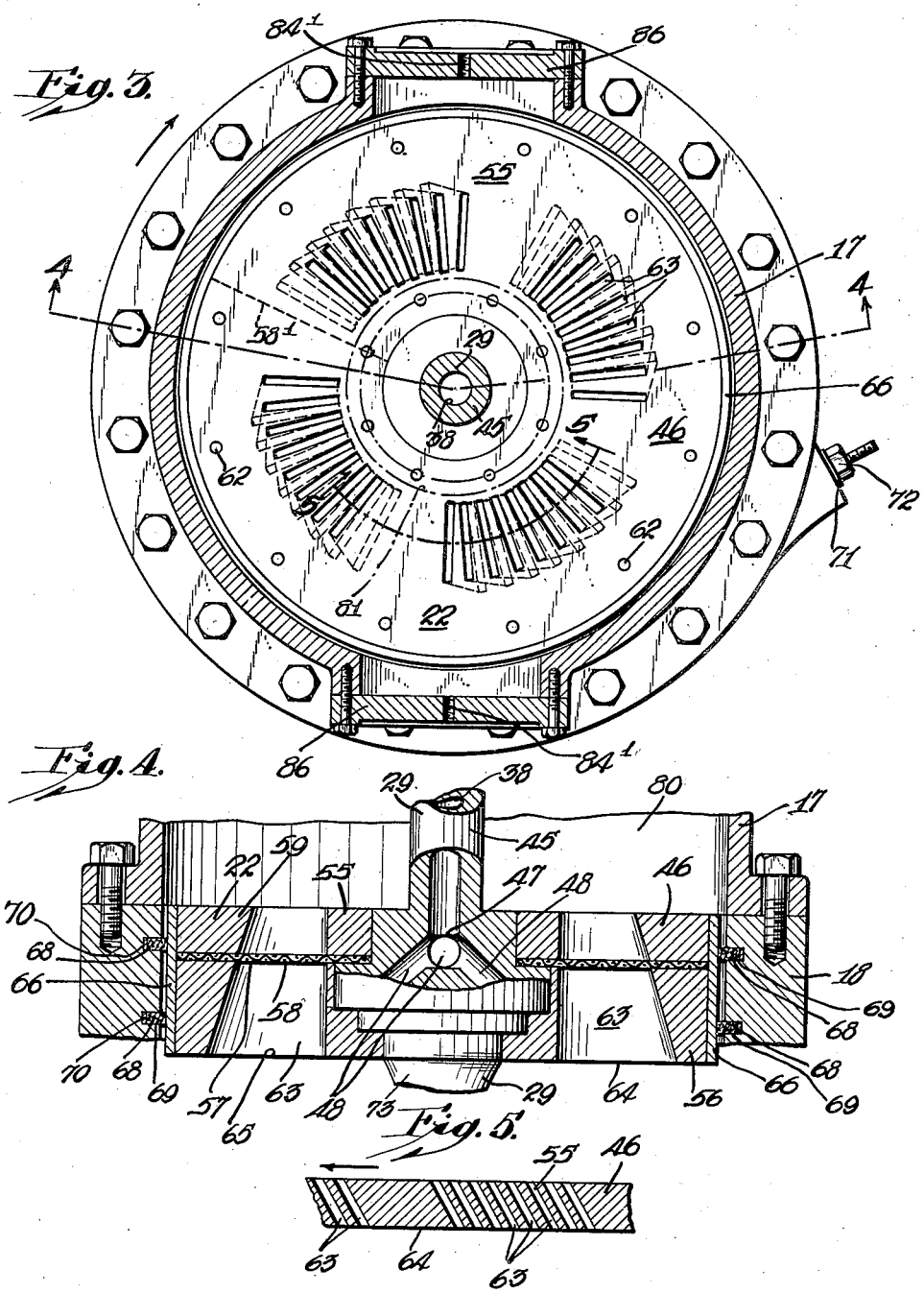

Patented June 24, 1941

2,246,877

UNITED STATES PATENT OFFICE 2,246,877

ROTARY FILTER

Aiken C. Cunningham, Beechwood, N. J.

Application June 8, 1937, Serial No. 147,016

17 Claims. (Cl. 210—196)

The invention relates to rotary filters which are, for example, suitable for filtering sewage. While the invention is applicable to the filtration of liquids other than sewage, such as chemicals, the application to sewage is expected to be a very wide one and therefore the liquid to be filtered is generally referred to herein as sewage, it being understood that this term will also include any other suitable liquid to be filtered.

A purpose of the invention is to receive the inflow to the filter of pumped sewage at the interior of a rotor and to distribute the sewage outwardly and develop additional pressure by centrifugal force.

A further purpose is to filter through a rotor which supplies sufficient filtering pressure to overcome and permit the use of the fending action of diagonal vanes leading to the filter.

A further purpose is to provide a rotor with a filter and with angularly located passages whose trailing surfaces fend off solids from the filter.

A further purpose is to provide a rotary filter having the filtering material generally transverse to passages through the rotor disposed at an angle to the axis and extending from end to end, the passages preferably converging in cross-section and desirably carrying vanes to cause outwardly directed pressure upon the solids.

A further purpose is to use angularly alternate parts of a rotor for centrifugal discharge of inflowing sewage into a chamber and for filtering sewage passing from the chamber through a filter within the rotor.

A further purpose is to deliver the sewage in a spirally distributed stream along the outer circumference of the upper part of a closed space while withdrawing for filtering purposes from the interior of said spiral delivery stream and while protecting against mingling of the two streams and to utilize the lower part of the closed space as a settling chamber and for this purpose to damp circumferential movement in the lower part of said closed space.

A further purpose is centrifugally to throw inlet sewage to the outer circumference of a closed space tapering at the bottom, to withdraw it from the interior of the closed space for filtering and to separate the paths of inlet and outlet flow in the upper part of the closed space while damping against circumferential movement of the sewage in the lower part of the space to utilize this lower part as a settling chamber.

A further purpose is to use a rotor for centrifugal discharge of inlet sewage passing through the rotor, to settle said sewage and to discharge the effluent through a filter within the same rotor, using for the discharge the pressure of the intake less the pressure effect of diagonal vanes.

A further purpose is to bring sewage in through a rotor, from which it is discharged by centrifugal force into a sediment chamber, around the outside of a partitioning skirt, and to withdraw the sewage from the space within the skirt through a filter within the inner part of the rotor.

A further purpose is to use the same rotor for influx of sewage directed by centrifugal force into a sediment chamber and for operating vanes fending off the solids of the effluent from passages through the filter.

A further purpose is to maintain a chamber filled with air under pressure in communication with the filtrate from a rotary filter to smooth out irregularities in the delivery pressure of the filtrate.

A further purpose is to pass inwardly flowing sewage through a rotor and discharge the sewage through a filter within the same rotor, into a skirted outlet, using the space about the skirted outlet as an air chamber to smooth out differences in pressure within the space in which the rotor turns.

In a filter, a further purpose is to provide a rotary filtering element in which the rotor is sealed by packing about the circumference and in which the packing is tightened brake-like by an adjustable surrounding band.

A further purpose is to provide a rotary filter in which the rotor has a smooth drum-like circumference, and fixed packing surrounds this drum and is tightened by a band engaging the circumferential exterior of the packing and capable of being tightened.

A further purpose is to provide packing to protect parts against leakage of sewage past the packing and additionally protect by applying water pressure behind the packing so that the pressure of the sewage shall be approximately nullified or so that there shall be definite leakage of water rather than sewage past the packing.

A further purpose is to protect those areas between packings against intrusion of undesirable material by filling the space with water at a pressure sufficient to prevent leakage into the space and desirably to provide leakage of water instead from the space.

A further purpose is to provide a rotating shaft having a bore with adjacent inlet through a fixed member and with packing between the fixed member and the rotating shaft adjacent the inlet whereby the inlet discharges substantially and directly into the bore.

A further purpose is to jacket the rotor of a rotary filter at the point at which it extends through a settling chamber of the filter.

Further purposes appear in the specification and in the claims.

I have preferred to illustrate one form only of the invention, selecting a form which is practical and highly effective and which at the same time well illustrates the principles of the invention.

Figure 1 is a side elevation of the filter of the present invention.

Figure 2 is a central vertical section of the filter of Figure 1.

Figure 3 is an enlarged section on the line 3—3 of Figure 2.

Figure 4 is a fragmentary section on the line 4—4 of Figure 3.

Figure 5 is a fragmentary section on the line 5—5 of Figure 3.

Figure 6 is an enlarged section on the line 6—6 of Figure 2.

Figure 7 is a fragmentary section of the rotor on the line 7—7 of Figure 6.

Figure 8 is a section on the line 8—8 of Figure 6.

In the drawings similar numerals indicate like parts.

For convenience of manufacture and particularly of assemblage, the casing of the filter shown has been split up into a number of parts 15, 16, 17, 18, 19, 20 and 21, of which 15 is a cap housing, 16 and 20 are bearing housings, 21 is a gear housing, and 17, 18 and 19 effectively house the operating mechanism and cooperate with it for the purposes indicated. The several casing parts are held together by suitable flanges and bolts which have been shown, but which it has not been considered necessary to describe in detail, as their purpose and function are well known and are very clear from the drawings.

The supporting, guiding, packing and driving mechanism may be briefly described. For the most part it has no place in the present invention and might be substituted by any of a great variety of constructions for the same purpose.

The rotor 22 rotates within the series of casing parts, and is driven suitably at very high speed by a shaft 23. This shaft is supported in suitable bearings seen at 24 and 25 and is packed at 26. It carries a gear 27 engaging a gear 28 upon the lower end of a rotor shaft 29. The rotor shaft 29 is supported vertically and laterally for rotation by any suitable bearings of which two are shown at 30 and 31. Glands and packing are shown at 32, 33, 34 and 35 for which the usual retaining and tightening devices may of course be used.

A soft metal washer 36 is shown at the upper end of the rotor shaft directly beneath an inlet opening 37 by which the sewage or other material to be filtered is conducted to the rotary filter. The filter is quite suitable for handling sewage but is of course adapted to handle a considerable variety of material requiring filtration. For convenience in description as already explained this material will be referred to herein as sewage, intending to include therein all materials of sufficient fluidity and of such character as to be capable of being filtered by such a construction.

The inlet opening 37 is directly in line with a bore 38 of the rotor shaft 29.

A bearing cover 39 is secured between adjacent flanges of the cap housing 15 and the upper bearing housing 17. The bearing is protected from moisture by packings preferably of felt shown at 40 and 41. The inner cones 42 of the bearings are adjusted to set the bearings to take up wear and to hold them in set positions by brass nut and washer devices 43 and 44.

The rotor bore 38 leads down through the length of an upper rotor stem 45 to a rotor body 46 where it branches at 47 into any desired number of outwardly directed passages 48 which are connected with outlets 49 passing through to the lower surface of the body for discharge of sewage in a whirling stream into the outer part of settling chamber 50 at a point outside of a fixed skirt 51 supported from a spider 52 secured to the housing part 19. The sewage is guided into the outer part of the settling chamber to avoid confusion of the downwardly directed flow of inlet sewage with the upwardly flowing supernatant liquid from the settling chamber.

Sludge-like sediment is withdrawn from the settling chamber 50 through suitable valved connections 53.

It will be noted that the lower housing through which this settling takes place is preferably conical in the lower part and that the skirt 51 is also conical toward its lower end.

The rotor body, which has thus far been considered as if it were a unit, for convenience of manufacture is made up of composite parts including an inner hub 54 and a split annulus 55 secured to the hub, both bolted to it and keyed to it in order to take the additional stress of rotation of the annulus. The annulus 55 comprises a lower ring 56 containing the outer parts of the channels 48 and providing a seat at 57 for filtering material 58, cut through at some such position as 58', Figure 3, so as to permit removal past the shaft, and an upper ring 59 retaining the filtering material 58 against the seat. The rings are respectively held in position, the one by screws 60 and keys 61 and the other by screws 62.

Screws 62 are accessible through a window or hand opening, after which the ring 59 can be lifted far enough to give access beneath it through the window to change the filter material.

Within the body of the rotor and outside of the hub comprising parts of this body are shown outflow openings 63 which provide passage completely through the body of the rotor except for the filtering material; that is, fluid accumulating in the upper part of the settling chamber finds outlet through these outflow passages and during its outlet movement passes through and is filtered by the filtering material. The outflow passages 63, considered from a circumferential standpoint are located between the respective inlet passages 48, and from a radial standpoint lie within the boundaries set by the skirt 51, so that during the rotation of the rotor, inflow is taking place to the settling chamber outside the skirt with outflow from the area within the skirt angularly between the passages 48.

The inlet pressure is assisted by the centrifugal force produced through the rotation of the inlet passages 48 extending from inner to outer positions, but the outlet force is retarded because of rotation of the rotor. This is true primarily because of the termination of the outlet passages in vanes diagonal to the lower face 64 of the rotor and diagonal to perpendicular radial planes at this point, which, with the direction of rotation shown tend to exclude both liquids and solids, but particularly the solids which encounter the vanes 65. The trailing vane surfaces of the outlet passages tend greatly to reduce outlet through these filter-containing passages. Pressure from some source such as the diagrammatically shown pump 37' forces outlet through the passages 63 in spite of the forces tending to cause reverse flow. Since this action is greater against the solids than against the liquid the outflow of filtrate is largely liquid.

Though the liquid has a tendency to whirl as it flows upwardly within the skirt, it is not given any rapid rate of revolution until it engages the rotor. The pressure of the rotor against the liquid is therefore depended upon to overcome its inertia and to whirl it along with the rotor. As the tendency of the solids suspended within the liquids to lag against the wall of the outflow channel is greater than that of the liquid itself, there is a resultant concentration of solids along the surface of the driving face in each channel.

There is also a considerable centrifugal force set up within the channel. The effect of this centrifugal force is greater upon the solids in suspension than upon the liquid in which they are suspended, with the effect that there is a greater concentration of solids within the liquid at the radially outer part of the channel and along the radially outer wall than radially inside these locations.

The wedge action resulting from the lag of the inlet end of the outlet passages with respect to the position of the filter within the passage causes a downward discharge of liquid along the wedge surface, i. e. of liquid within which solid matter is relatively concentrated. Likewise, the radial outward pressure due to the intake pressure plus the pressure added by centrifugal force, acting against the wedge shaped radially outer wall of each channel causes a downward discharge of liquid close to this wall. This liquid also is relatively high in suspended solids.

The combined effect of the two forces above is to cause downward discharge of a portion of the liquid containing a relatively concentrated suspension of solids, excluding these solids from the passage and discharging them downwardly and radially outwardly, but not before they have been given a high rate of revolution which throws them out centrifugally toward the inner wall of the skirt, down which they gravitate, dropping into the space below the skirt.

The centrifugal inlet force due to rotation of the rotor is added to the pump pressure upon the sewage as it is supplied to the rotor. Whatever the source of the pressure it is necessary that the filter operate under considerable pressure and that the rotor be sealed against the adjoining casing to avoid regurgitant flow of sewage from the settling chamber back past the rotor into the filtrate. This regurgitant leakage is prevented by packing about the surface of the body cooperating with a smooth outer rotor surface.

For convenience the outer part of the rotor body has been encased within a smooth outer shell 66 fastened around the rotor in any suitable way, by screw 67.

With the shell cooperate circumferentially fixed rotor packings 68 lying within circumferential grooves 69 in the fixed intermediate casing member 18.

Within the grooves 69 and outside of the packings lie metal bands 70 which are capable of being tightened about the packings in much the way that brake bands are tightened about a brake drum, one end of each band 70 being held at 71 (Figure 6) and the other end being pulled longitudinally by any suitable mechanism such as that shown at 72 with the purpose and effect that the packing shall be tightened circumferentially about the rotor shell.

The lower rotor stem 73 is protected from the content of the settling chamber by a fixed sleeve 74 rigid with the base 75 of the conical lower part of the casing member 19; and the upper part of this sleeve 74 laterally supports and steadies the lower stem 76 by the gland and packing 34 which at the same time prevents the content of the settling chamber from entering the space between the lower stem of the rotor shaft and the sleeve. This steadying action of the gland and packing seems to reduce vibration, since the gland and packing function in a sense as a bearing.

In order that the motion of the rotor may not be communicated unduly to the content of the settling chamber within the lower housing, a baffle 77 is inserted between the fixed sleeve 74 and the inner wall of the conical settling chamber. This baffle 77 preferably extends upwardly to a point near and desirably above the lower end of the conical skirt 51. An important function of the fixed sleeve 74 is to prevent the lower stem of the rotor from imparting motion to the content of the lower part of the settling chamber.

In order to additionally protect against leakage of sewage from the casing beneath the rotor past the rotor notwithstanding the two rings of band-tightened packing 68, and in order to protect the space between the lower stem of the rotor shaft and sleeve 74 from entry of sewage past the gland and packing at 34, water or other suitable fluid under pressure is admitted at each of these points through connections 78 and 79 respectively so that there shall be approximately as much pressure of water between the packings 68 and between the lower stem 73 and the sleeve 74 as the pressure of sewage tending to force the sewage past the particular packing. There is of course no objection and some advantage in maintaining a higher water pressure at these points than the pressure of sewage available in order that there may be definite leakage of water past the packings into the sewage to counteract and overcome the tendency of leakage of sewage into the water.

The flow from the settling chamber 50 takes place within the skirt 51 upwardly through the outflow passages 63 and through the filter material 58. This takes place in spite of the slope of passages 63 upwardly and forwardly as respects the direction of revolution of the adjacent part of the rotor and despite the variant radii and consequent variant centrifugal forces.

Removal of the solids which lodge below the filtering material and within the passages 63 is accomplished by pumping clear water through the passages in a direction reverse to that of sewage travel. Clearing the passages in this way is facilitated by the larger cross-section of these passages at the bottom than at the top and the progressive reduction of cross-section from the bottom toward the top.

The combined wedge action of the circumferentially trailing surfaces of the outflow passages and the tapered end surfaces of these passages must not exceed in pressure effectiveness the inflow pressure as it would clog operation. It is the intention that the combined pressures shall be sufficient to exclude and discharge the layers of what has been called supernatant liquid adjacent the wedge surfaces but that there shall be a continued outflow of liquid throughout the remainder of the passage and through the filtering material.

The division of the solid matter and liquid within the outflow passages against the trailing wall by reason of inertia and against the outer ends of the passages by reason of centrifugal force is greatest at the lower ends of the passages but takes place throughout the lengths of the passages. For a given concentration of solids in the supernatant liquid as it approaches the rotor the combined separating effects greatly reduce the quantity of solid matter which reaches the filtering material and correspondingly extend the length of filtering life before it is necessary to clean the filtering material.

By reason of the pressure within the settling chamber the supernatant liquid is crowded into the lower part of the outflow passages 63. The result is that the supernatant liquid within the outflow passages 63 will be forced against and through the filter material 58 by the combined forces of the normal pressure at which sewage is fed into the rotor shaft and the centrifugal pumping of the liquid as it passes through the rotor and in spite of the wedge action of the vanes 65 against the outwardly flowing liquid.

As the filtrate discharges from outflow passages 63 into the upper chamber 80, its only path of flow lies through the upper skirt 81 and thence out through discharge passages 82 of which any suitable number may be used. Since the filtrate is intended to rise higher in the upper chamber 80 than the lower edge of the upper skirt 81, air will be trapped in the space 83 and will be compressed to form a cushion. This air cushion tends to smooth out variations in pressure with the chamber 80, and so reduces pulsation in the discharging filtrate. A pressure gauge should be connected to the interior of the settling chamber 50. It may be connected as at 84 through the inspection door 85. A similar inspection door 86 is shown permitting access to the chamber 80. In it is shown a second gauge connection at 84'.

In operation sewage passes in through the bore 38 of the rotor stem 45 at pump pressure which is increased by the centrifugal action upon the sewage during passage through the branches, entering the settling chamber as a whirling stream outside of the skirt 51. Since there is escape for the supernatant liquid through the filter material, there will be a constant influx of sewage outside of the skirt 51, toward the bottom of the skirt 51. The solids will tend to settle to the bottom of the settling chamber and can be cleaned out from the bottom by blowing off through the valved connections 53 at suitable intervals. The whirling action particularly at the top of the settling chamber both outside of the skirt and inside it tend to throw the sediment to the outer edge and eventually to cause it to reach the bottom of the settling chamber.

As distinguished from the solids settling to the bottom, the lighter relatively clearer liquid floating on the top, here called the supernatant liquid, will fill the inside of the space within the skirt and there will be pressed into engagement with the lower surface of the rotor body and hence will enter the outflow passages 63. This supernatant liquid fills these passages and passes through them and through the filter cloth in spite of the wedge actions of the trailing surfaces of the passages which tend to force the supernatant liquid back, the final pressure being less than that within the skirt. As the supernatant liquid flows through the passages, way is cleared for additional flow of supernatant liquid into the passages, whereby the flow of the supernatant liquid through the filter medium is that due to the difference between the pressure within the settling chamber and the pressure given by the wedging trailing surfaces of the outflow passages 63.

As the supernatant liquid flows through the filter medium it of course becomes filtrate, flowing into the filtrate chamber 80 where it encounters the air in the upper part of the filtrate chamber. This air bell smooths out irregularities of the pressure and forces the filtrate out through the skirt 81 to discharge through pipes 82.

The pressure gauges make it possible to keep track of the ultimate pressure and, if desired, to control the inlet pressure of the sewage accordingly. Alteration of pressure in the filtrate chamber may indicate a difference in fluidity of the sewage being received so that it will require different treatment and lowering of this pressure may indicate clogging of the filter medium.

The fact that the skirt dips into the filtrate chamber maintains the air in the upper part of the filtrate chamber and at the same time collects and guides the outwardly flowing stream at a point far enough below the filtrate level so that the outward flow but little disturbs the surface of the filtrate.

It will be evident that the constant discharge under pressure from the rapidly turning rotor results in a whirling and outwardly turning motion of the sewage or other matter to be filtered within the annular space outside of the lower skirt with continuing tendency to deposit the solid matter against the inner wall of the container and continued gravitation of this solid material down along the inside of the container wall and into the settling tank. The whirling action of course reduces in intensity as the content of this annular space moves downwardly. Any tendency to whirl within the casing below the skirt is reduced by the baffle 22. The sleeve 74 prevents rotation of the shaft from contributing toward whirling action within the settling tank.

It will be evident that difference in rates of discharge of filtrate due for example to differences in fluidity of the material to be filtered will be smoothed out by the air bell above this filtrate.

It will be evident that the bearing (packing) between the upper end of the protecting sleeve 74 and the lower stem of the shaft will not only protect against intrusion of unfiltered material within this space but will also have a slight supporting or damping effect against vibration of the shaft.

The filtering material must be chosen to suit the particular material which is being filtered. For ordinary uses wire cloth may be employed or fabric or fabric backed up by wire cloth. For special uses filter paper, asbestos fiber or other well known filtering materials will be suitable.

Both on the inlet flow and on the outlet flow the rotor exerts a pumping action, acting by centrifugal force to apply or to increase the pressure causing flow of inlet sewage into the system and acting by the wedge action of diagonal vanes to reduce pressure tending to cause filtration. The rotor is effective thus as a self-pumping unit on the inlet and as a retarder of solids on the discharge flow, both being effective for their several purposes and being opposed from a pressure standpoint. Both help in the common purpose of filtering, the one by providing the pressure which forces the supernatant liquid from the settling tank through the filter and the other casting off solids into the settling tank.

In view of my invention and disclosure variations and modifications to meet individual whim or particular need will doubtless become evident to others skilled in the art to obtain all or part of the benefits of my invention without copying the structure shown and I therefore claim all such in so far as they fall within the reasonable spirit and scope of my invention.

Having thus described my invention, what I claim as new and desire to secure by Letters Patent is:

1. The method of filtering liquid having solid matter in suspension by the action of a rotor within a casing which consists in delivering under pressure within the casing a liquid stream, in whirling the stream about an axis within the casing, in settling solids from the stream along the interior walls of the casing, in withdrawing the more liquid part of the stream from the interior of the casing through generally radial passages while shielding the withdrawing stream from engagement with the settling stream, and finely dividing the withdrawing stream, in whirling the divided streams about the axis of the casing and at the same time filtering them, using the higher inertia of the solids than of the liquid to concentrate the solids in the trailing parts of the streams and in reversely discharging the concentrated solids in backward directions as compared with the direction of travel of the filtering liquid by pressure upon them along stream surfaces diagonal to the planes of rotation.

2. The method of filtering liquid having solid matter in suspension which consists in delivering a stream under pressure within a casing, in whirling the stream about an axis within the casing, in settling solids from the stream along the interior of the casing, in withdrawing the more liquid part of the stream through the interior of the casing while shielding the withdrawing stream from engagement with the settling stream, in finely dividing the withdrawing stream, in whirling the divided streams about the axis of the casing and at the same time filtering them, concentrating the solids in the radially outer parts of the streams by centrifugal force and restraining the force developed along surfaces of the streams outwardly and rearwardly in planes through their axis of revolution diagonal to their radii of revolution, whereby the concentrates tend to discharge in a composite path radially outwardly and rearwardly with respect to the filtrates.

3. The method of filtering liquid having solid matter in suspension which consists in delivering a stream under pressure within a casing in whirling the stream about an axis within the casing, in settling solids from the stream along the interior walls of the casing, in withdrawing the more liquid part of the stream through the interior of the casing while shielding the withdrawing stream from engagement with the settling stream, in finely dividing the withdrawing stream, in whirling the streams about the axis of the casing and at the same time filtering them, coincidentally using the higher inertia of the solids than that of the liquid against initial whirling to concentrate the solids in the trailing parts of the streams and in concentrating the solids in the radially outer parts of the streams by centrifugal force and restraining them along surfaces of the streams extending outwardly and rearwardly diagonal to their planes of revolution whereby the concentrates tend to discharge along the trailing and radially outward surfaces of the streams and are discharged reversely as compared with the direction of flow of the clearer liquid.

4. The method of settling and filtering sewage and other like material using rotation within a closed vessel, which consists in admitting the sewage under pressure into the upper outer part of the vessel in a stream, in whirling the stream about the axis of rotation, in allowing the solids of the stream to settle out by centrifugal action and by gravity along limiting walls of the vessel, coincidentally withdrawing the supernatant mixture from the interior of the closed space while shielding it from the downwardly settling stream, in using inlet pressure to discharge the mixture in divided streams, in whirling the streams about the axis of rotation of the vessel to concentrate the solids by inertia in one part of said streams and at the same time subjecting each stream to reaction pressure diagonal to the planes of rotation in a direction tending to force said part of each stream back and out from the discharge to exclude solids from the streams, and in filtering the streams during their discharge.

5. The method of settling and filtering sewage and other like material using rotation within a closed vessel, which consists in admitting the sewage under pressure into the upper outer part of said vessel, in whirling the stream about the axis of rotation, in allowing the solids of the stream to settle out by centrifugal action and by gravity along the walls of the closed vessel, coincidentally withdrawing the supernatant mixture from the upper interior of the closed vessel and filtering it under pressure of the inflowing stream and at the same time subdividing the filtering mixture, revolving it about the axis of the vessel and retarding passage of solid matter within the filtering mixture through centrifugal force progressively lessened as the subdivided mixture progresses toward discharge.

6. A casing, inlet and outlet connections therefor, and a filter rotor in the casing, the rotor dividing the casing into two chambers and comprising a rotatable body having passages through the body and intermediate filtering material across the passages, the circumferentially trailing faces of these passages lagging at their intake ends with respect to the positions of these faces adjacent the filtering material, the extent of lagging progressively reducing from the intake ends of the passages toward the filtering material.

7. A casing, inlet and outlet connections therefor, and a filter rotor in the casing, the rotor dividing the casing into two chambers and comprising a rotatable body having passages through the body and intermediate filtering material across the passages, the radially outer faces of these passages being of larger diameter at the intake ends of the passages than at the parts of the passages adjacent the filtering material and the diameters progressively reducing from the intakes toward said material.

8. A casing, inlet and outlet connections therefor, and a filter rotor in the casing, the rotor dividing the casing into two chambers and comprising a rotatable body having passages through the body and intermediate filtering material across the passages, the circumferentially trailing faces of these passages lagging at their intake ends with respect to the positions of these faces adjacent the filtering material, the extent of lagging progressively reducing from the intake ends of the passages toward said material and the radially outer faces of these passages being of larger diameters at the intake ends of the passages than at the parts of the passages adjacent the material and the diameters progressively reducing from the intakes toward said material.

9. In a rotary filter, a casing having a discharge outlet for filtrate, a rotor body across the casing having inflow and outflow passages within the body, the inflow passages delivering near the outer circumference on that side of the rotor opposite to the discharge outlet, and the outflow passages sloping so as to have their opposite ends in different positions circumferentially of the body, an intake communicating with the inflow passages of the rotor, the outlet ends of the outflow passages being in advance in the direction of rotation of their intake ends, and the outer wall of the intake ends being located farther from the axis of the rotor than the outer wall of the outlet ends, to apply centrifugal force in opposition to outward flow, a hollow rotor shaft providing sewage supply for the inflow passages near the center of the body and filter material carried by the rotor arranged across the outflow passages, whereby with rotation of the body centrifugal force adds to the pressure of delivery of the inflow and the diagonal pressure of the trailing outflow walls and the slope of the outer outflow walls toward the axis is effective to retard outflow of solids against the filter material.

10. In a rotary filter, a casing, a centrally hollow vertical rotor within the casing, dividing the casing into two compartments, one for filtered liquid, and the other for unfiltered liquid, the hollow of the rotor forming a delivery passage for inflow material to be filtered, a discharge outlet for liquid filtrate, distributing channels in the rotor extending from the said hollow outwardly and delivering downwardly from the rotor in a whirling stream near the outer circumference thereof, a hollow skirt below the rotor and having its axis coincident with the rotor axis, inside the said inlet stream, the rotor having through outlet passages above the skirt level supplied with fluid through the skirt from the inlet supply, and filtering material across said outlet passages at intermediate points in their lengths, whereby the liquid to be filtered is delivered from the said channels into the casing interior at a portion thereof outside the skirt to pass down outside the skirt and then to filter upwardly through the interior of the skirt and through the rotor.

11. A rotary filter comprising a casing, a rotor dividing the casing into two chambers and having passages for inlet and outlet flow of fluid through it, the inlet extending outwardly toward the circumference to points of discharge near the circumference of the rotor, whereby inlet is assisted by pressure from centrifugal action, and outlet passages through the rotor diagonal with respect to the planes in which rotation takes place, the discharge ends leading the inlet ends of these outlet passages and thus producing sloping trailing walls of the passages tending by their pressure to force the outgoing material back, the centrifugal action in the inlet and the pressure against the sloping walls in the outlet producing pumping action in the passages, the pumping action in each tending to feed material through the rotor toward the same side of the rotor, filtering material supported by the rotor, across the outlet passages and discharge outlet for the liquid which passes through the rotor.

12. In a rotary filter, a casing, a rotor transversely dividing the casing into settling and filtrate compartments separated by the rotor, the rotor having inlet passages extending from near the center to outlets into the settling compartment near the circumference, and having outlet passages from the settling compartment to the filtrate compartment located circumferentially between the inlet passages, the said outlet passages sloping in such a direction from one face of the rotor to the other that the discharges from said passages respectively lead the intake of said passages during rotation, the said outlet passages also sloping rearwardly and radially outwardly so that their radially outer walls are further out from the rotor axis at the trailing intake ends of the passages than at their outlet ends, filtering material across the outlet passages means for supporting and rotating the rotor and containing passage for inlet material to be filtered and a discharge outlet from the filtrate compartment.

13. In a rotary filter, a casing, a filtering rotor in the casing having an inlet, the rotor dividing the casing into compartments for filtered and unfiltered liquid and having inlet and discharge passages, the latter inclined downwardly and rearwardly to retard filtering flow of solid material, filtering material across the discharge passages, an outlet for the filtered material, a shaft for the rotor extending below the rotor and through the settling tank, means for driving the shaft, a sleeve surrounding the lower part of the shaft through the settling tank protecting the material within the settling tank from stirring by the shaft, packing at both ends for the space between the sleeve and shaft and connection for safe fluid under pressure between the sleeve and shaft and between the packing locations whereby pressure of the safe fluid prevents leakage of other fluid into the space between the packings.

14. In a rotary filter, a casing, a rotor hollow shaft providing inlet passage for material to be filtered, a rotor on the shaft dividing the casing into settling and filtrate chambers, the rotor having passages for inflow of said material to the settling space below the rotor and having outflow passages between the chambers, a discharge outlet from the filtrate chamber, filtering material carried by the rotor and extending across the outflow passages, driving means for the shaft and a fixed sleeve surrounding the lower part of the shaft holding the material in the settling part of the casing away from the rotating shaft and thus preventing rotative effect of the shaft upon this material.

15. In a rotary filter, a casing having converging walls at the bottom forming a settling tank, blow out provision at the bottom of said settling tank, a sleeve projecting upwardly from the lower part of the settling tank, a shaft passing through the sleeve and hollow along an upper portion and communicating with the casing to deliver inlet material to be filtered, driving means for the shaft located below the settling tank, packing between the sleeve and shaft, a rotor body at an intermediate portion of the shaft dividing the casing into settling and delivery compartments, receiving inlet of material to be filtered through the hollow in the upper part of the shaft, and discharging filtrate to an outlet respectively, the body having outwardly extending distributing channels for the inlet material, delivering it at the underside of the rotor and near the inner walls of the casing, a skirt within the casing inside of the points of delivery of the inlet material, and the body having upward outlet passages therein whose intakes lie within the skirt, filtering material at intermediate points in the outlet passages and an outlet for the discharge.

16. In a rotary filtering device, an outer casing, a hollow rotor therein dividing the casing into lower and upper chambers, the latter receiving the filtrate and having a discharge outlet therefrom, a rotor shaft for the rotor extending both above and below the rotor and hollow above the rotor, the casing forming a receiving chamber for material to be filtered located below the rotor and terminating in a settling tank at the bottom, and the rotor having outwardly extending distributing passages from the hollow of the shaft, delivering downwardly into the receiving chamber and, intermediate the distributing channels, having upward outlet passages between the chambers, filtering material in the outlet passages and a fixed sleeve in the receiving chamber extending upwardly through the settling tank and bearing between the sleeve and shaft having steadying engagement with the shaft at its upper end.

17. In a rotary filter, a casing, a rotor hollow shaft providing passage for material to be filtered, a rotor on the shaft dividing the casing into settling and filtrate chambers, the filtrate chamber having a discharge outlet and the rotor having passages from the hollow of the shaft for inflow of said material to the settling space below the rotor and having outflow passages between the chambers, filtering material carried by the rotor and extending across the passages, driving means for the shaft, a fixed sleeve surrounding the lower part of the shaft, packing at the upper end of the sleeve between it and the shaft and a baffle located between the sleeve and the lower part of the wall of the casing to prevent circumferential movement of the material to be filtered.

AIKEN C. CUNNINGHAM.